United States Patent [19]

Harris et al.

[11] Patent Number: 4,639,646
[45] Date of Patent: Jan. 27, 1987

[54] TWO PEDAL, THREE-WAY CONTROL FOR CHILD'S RIDING TOY

[75] Inventors: Timothy S. Harris; Lawrence R. Harrod, both of Fort Wayne, Ind.

[73] Assignee: Kransco Manufacturing, Inc., San Francisco, Calif.

[21] Appl. No.: 697,838

[22] Filed: Feb. 4, 1985

[51] Int. Cl.$^4$ .......................... H02P 1/22; H02P 3/12
[52] U.S. Cl. ..................... 318/139; 318/256; 318/261; 318/280; 318/442
[58] Field of Search ............... 318/111, 139, 256, 257, 318/258, 261, 442, 280, 287, 288, 289, 290, 291, 293; 180/214, 216, 220, 65.1; 307/48, 50, 54

[56] References Cited

U.S. PATENT DOCUMENTS

| | | | |
|---|---|---|---|
| 3,241,019 | 3/1966 | Gross | 318/139 |
| 3,699,414 | 10/1972 | Gyori | 318/139 |
| 3,702,959 | 11/1972 | LeGloan | 318/139 |
| 3,818,293 | 6/1974 | Wood | 180/65.1 X |
| 4,157,123 | 6/1979 | Rodaway | 318/258 X |
| 4,158,158 | 6/1979 | Burkett | 318/139 |
| 4,313,517 | 2/1982 | Pivar | 180/216 |
| 4,558,263 | 12/1985 | Harris et al. | 318/139 |
| 4,563,621 | 1/1986 | Moore | 318/139 X |

FOREIGN PATENT DOCUMENTS 1284643 8/1972 United Kingdom ............... 318/139

Primary Examiner—William M. Shoop, Jr.
Assistant Examiner—Bentsu Ro
Attorney, Agent, or Firm—Kolisch, Hartwell & Dickinson

[57] ABSTRACT

A child's battery-powered riding toy includes a floorboard with two spring-biased switches that must be closed by the child operator to place the vehicle in self-powered motion and can only be reached simultaneously of the child operator is safely aboard. The battery power supply is capable of providing high or low voltage to the motor drive, but a reversing switch is connected between the battery power supply and the motor drive, and it must be in its "forward" position to receive the high battery voltage. In its "reverse" position, the reversing switch separately connects the motor drive to only the low battery voltage. The spring-biased switch connected directly to the reversing switch has a dynamic braking load connected to it to be placed across the motor drive when the reversing switch is in its "forward" condition and the latter spring-biased switch is allowed to be under the control of its biasing spring. The floorboard is supported by hangers from the frame of the toy vehicle and is connected by snap-fastener components to the hangers.

8 Claims, 7 Drawing Figures

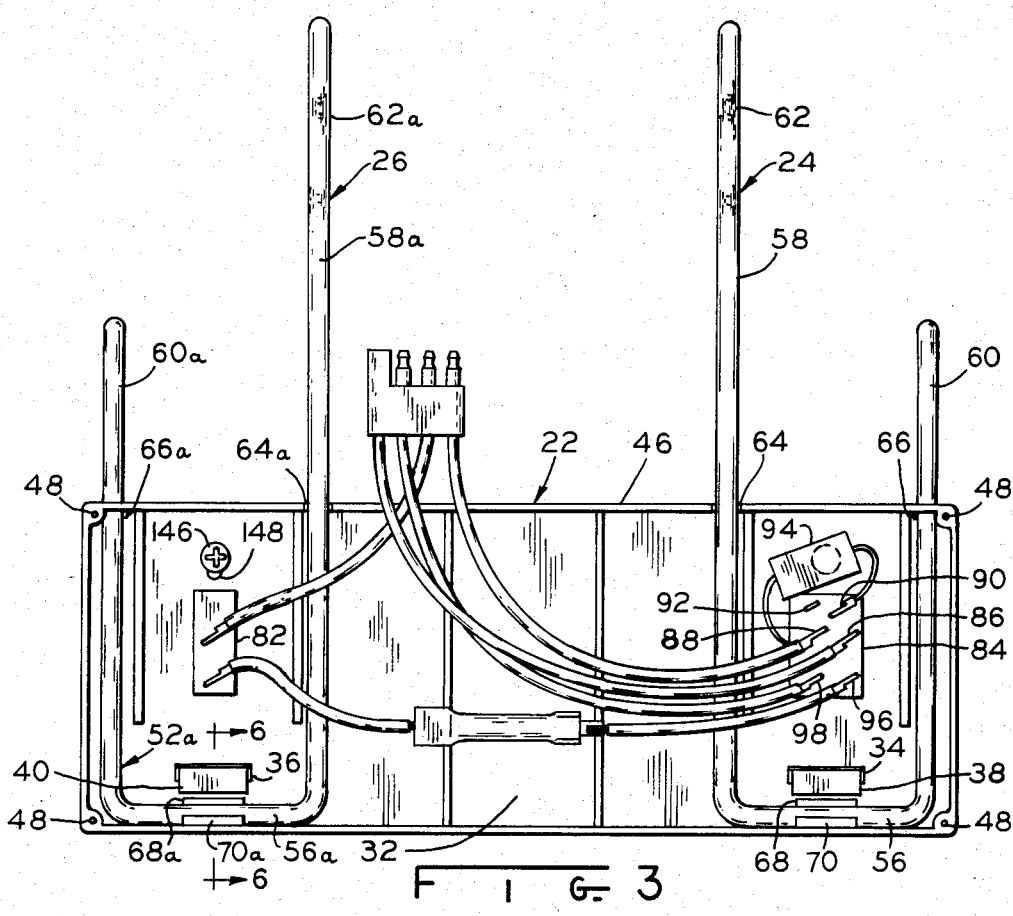
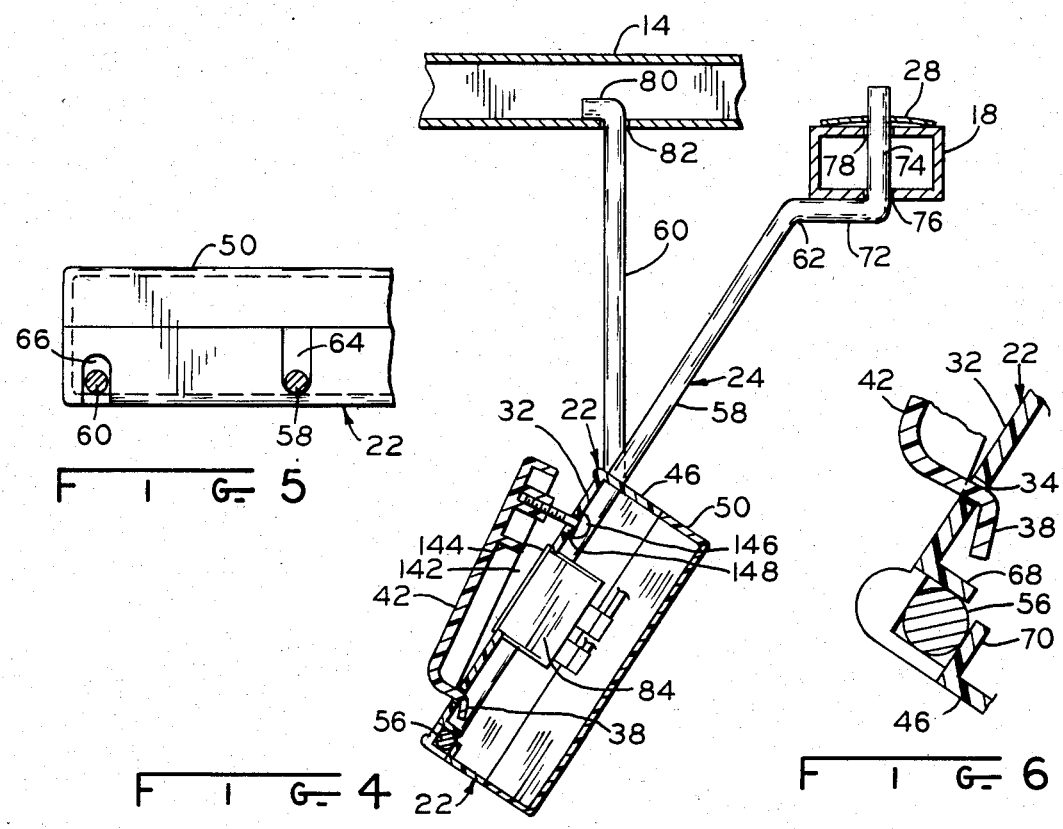

TWO PEDAL, THREE-WAY CONTROL FOR CHILD'S RIDING TOY

BACKGROUND OF THE INVENTION

1. Field of the Invention

This invention relates to a battery-operated child's riding toy capable of being driven both in the forward and reverse directions and to a floorboard structure that can be easily assembled to the frame of the toy to support motor control switches. In particular, the invention relates to a circuit to connect different voltages to a drive motor circuit when the toy is to be driven forward, thereby making it possible to drive the toy forward at different speeds. The circuit also limits reverse operation to a low speed and includes a dynamic braking load to be automatically connected across the drive motor circuit, when the circuit is in forward drive condition, unless the resilient bias in a spring-loaded switch is deliberately overcome to connect the drive motor circuit to the battery power supply.

U.S. Pat. No. 4,558,263 issued to Timothy S. Harris and Lawrence R. Harrod, and entitled ALL TERRAIN VEHICLE TOY WITH DYNAMIC BRAKING describes one of many types of battery-powered toy vehicles suitable for operation by small children. That toy vehicle resembles a full-sized gasoline powered tricycle and has small battery-powered motors connected to the two rear wheels. The battery power supply has two batteries and a double-pole-double-throw switch to connect them either in parallel to the motors, for low speed operation, or in series, for high speed operation. The circuit from the battery power supply to the motors includes a spring-biased safety switch that is normally open to cut-off battery current unless the child operating the toy vehicle maintains pressure sufficient to overcome the spring bias of the switch. A dynamic braking arrangement on the vehicle includes a lever to be operated by the child, who applies pressure to the lever by the same foot that must be applied to the spring-biased switch to maintain operating current to the motors. The lever is connected to another double-pole-double-throw switch that connects the motors either to the battery power supply (via the safety switch) or to a dynamic braking load that dissipates power generated by the motors when they are being driven by the wheels rather than vice versa. In order to actuate the brake lever, the child operator must release pressure on the spring-biased switch thereby opening the circuit that transmits current to the motors.

However, the switch that transfers the motors from connection to the battery power supply to the dynamic load does not make that transfer automatically by spring-biased operation and could not do so, because the same foot that the child operator uses to depress the spring-biased safety switch is also the foot used, alternatively, to depress the brake lever. Also, the toy vehicle of the aforesaid Harris-Harrod patent application does not have a switch to reverse current to the motors.

U.S. Pat. No. 4,313,517 issued Feb. 2, 1982 to Pivar, discloses a small battery-powered vehicle, although it is not a toy. The circuit includes a reversing switch to reverse current to the motor to cause the vehicle to back up, and it also includes two batteries with switching relays to connect the drive motor to one or both of them, but it does not include a connection from the battery power supply to the reversing switch that is separate for reverse operation than for forward operation. As a result, the vehicle can operate just as fast in reverse as in the forward direction.

SUMMARY OF THE INVENTION

It is one of the objects of the present invention to provide a child's battery powered riding toy with a reverse switch that connects a battery power supply to the motor drive means in the forward direction and has a separate connection to supply current in the reverse direction to operate the vehicle in reverse.

Another object is to provide a battery power supply for such a riding toy with means to supply a high or low voltage to the motor drive means in the forward direction but to apply only low voltage to the motor drive means, by way of the separate connection, when the toy is operated in reverse.

Another object is to use a spring-biased switch either to connect current from the battery power supply to the motor drive means, when that switch is actuated, or to connect the motor drive means to a dynamic braking load when actuating pressure is removed from that switch.

Still another object is to provide a second spring-biased switch to be operated by another part of the child operator's body, for example, the other foot, so that the circuit to supply driving current to the motor drive means for either forward or reverse operation does so only when the child operator is properly aboard the toy.

These as well as other objects and advantageous features of the present invention will be in part apparent and in part pointed out hereinafter.

The riding toy of the present invention includes motor drive means, a battery power supply, and a circuit to connect the battery power supply to the motor drive means. The battery power supply includes two batteries and a switching circuit to connect them either in series or in parallel to the connecting circuit so that either high or low voltage may be connected to the motor drive means, thereby causing either high or low current to be applied to the motor drive means. However, the connecting circuit further includes a reversing switch to supply driving current to operate the motor drive means in either the forward direction or reverse, and the reversing switch has a separate connection to the battery power supply to allow only the low voltage, and, therefore, low current, to be supplied to the motor drive means when the reversing switch is placed in its "reverse" condition.

The battery power supply is connected by a spring-biased switch to the reversing switch to complete the connection from the battery power supply to the motor drive means only when that switch is actuated by the child operator, e.g., by pressure of the child's foot. This spring-biased switch has contacts that are engaged in its normal, undepressed condition to connect a dynamic braking load across the motor drive means to dissipate power when the switch is not depressed and the reversing switch is in its "forward" position. A second normally open spring-biased safety switch is connected in series between the battery power supply and the first spring-biased switch and is located on the vehicle to be operated by the child operator's body, e.g. by the other foot, only when the child operator is properly positioned in or on the riding toy and to prevent operation of the toy when the child operator is only partly aboard.

The above-mentioned and other features and object of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 3 is a view of the under side of the floorboard in FIG. 2;

FIG. 4 is a cross-sectional view of the floorboard assembly along the section lines 4—4 in FIGS. 2 and 3;

FIG. 5 is a fragmentary view of the front end of the floorboard assembly along the section line 5—5 of FIGS. 2 and 3;

FIG. 6 is an enlarged cross-sectional view of a fragment of a switch actuator along the section line 6—6 in FIG. 3.

DESCRIPTION OF THE PREFERRED EMBODIMENT

Figure 1:
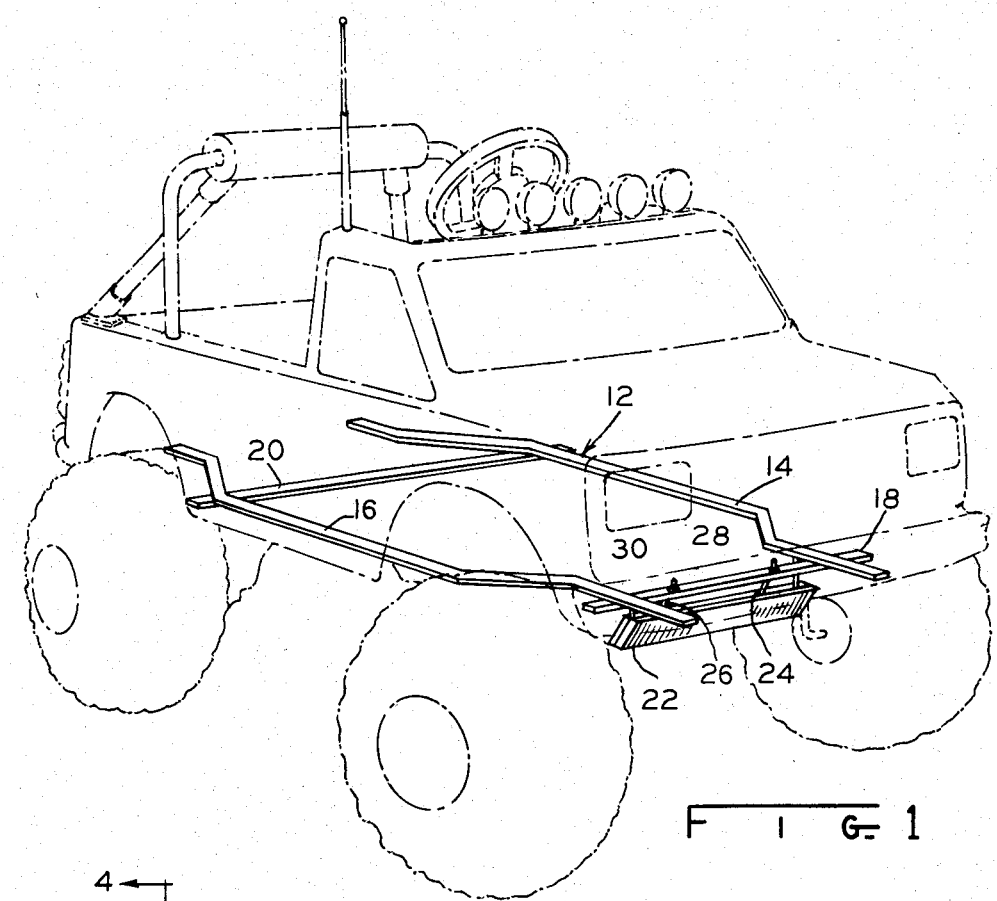
FIG. 1 is a perspective view of the frame of a child's riding vehicle and a floorboard mounted thereon according to the invention.

Referring to FIG. 1, there is illustrated a frame 12 for a child's riding vehicle. The frame includes two side members 14 and 16 that are mirror images of each other and are joined together by front and rear cross members 18 and 20. A floorboard 22 is supported by hangers 24 and 26, one end of each of which extends through a hole in the front cross member 18 and is held in place by a twist nut 28 and 30, respectively. The other ends of the hangers 24 and 26 extend through holes in the lower side of the side members 14 and 16, respectively.

Figure 2:
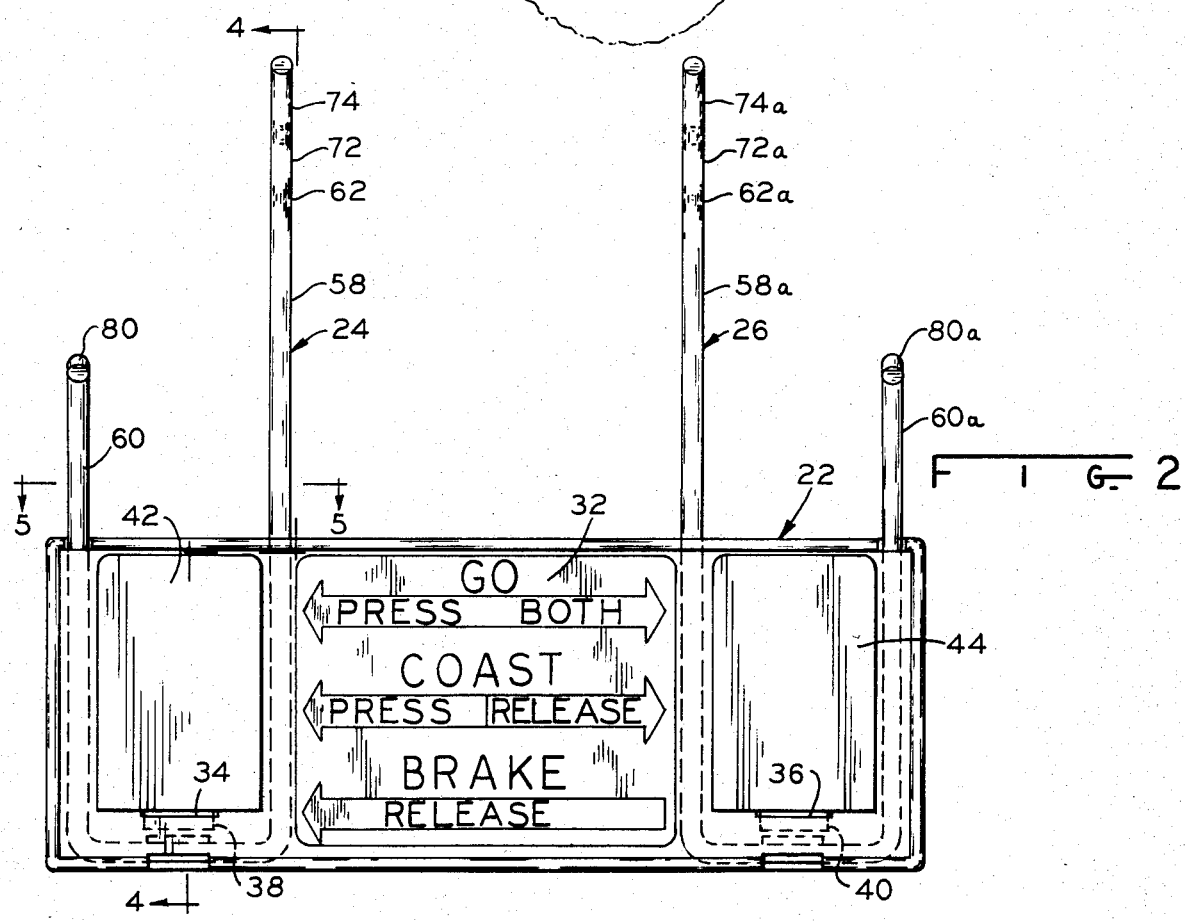
FIG. 2 is a plan view of the floorboard in FIG. 1.

FIG. 2 shows the top surface of the floorboard that generally faces the seat (not shown) of the riding toy in FIG. 1. The floor board has a main, or central, portion 32 with two slots 34 and 36 into which hinge tangs 38 and 40 of two switch covers 42 and 44, respectively, are loosely inserted. Operating instructions for the switches under the covers 42 and 44 are printed on the essentially flat central portion 32 between the covers.

FIG. 3 shows the under side of the floorboard 22. The central portion 32 is bounded at its perimeter by a rim 46 that has guide holes 48 in each of its corners to receive screws that hold a cover 50, shown in FIGS. 4 and 5, in place. Both the floorboard 22 and the cover 50 are molded of a suitable thermoplastic material, such as polypropylene or polyethylene, that is strong enough to take the abuse expected to be meted out to this part of a child's riding toy. At the same time, such materials have the requisite dimensional stability and limited flexibility to allow components to be fitted together to make a complete floorboard assembly.

The hangers 24 and 26 consist of steel rods 52 and 54 of substantially circular cross section bent so that, in FIG. 3, they appear to be U-shaped with a bight 56 and two arms 58 and 60. The arm 58 extends straight from one end of the bight 56 to a bend 62 and, along this straight part, is parallel to the central portion 32 of the floorboard 22. At the edge of the floorboard, the arm 58 passes through a notch 64 in the rim 46.

The part of the arm 60 closest to the bight 56 is parallel to the straight part of the arm 58 and, like that straight part and the bight 56, is in surface-to-surface contact with the under side of the central portion 32 of the floorboard 22. The arm 60 does not pass through a notch like the notch 64, but instead, passes through a hole 66, part of which may be seen to extend into the edge of the central portion 32 and the rest of which is in the adjacent part of the rim 46, as shown in FIG. 5. Immediately outside of the rim 46, the arm 60 bends at an angle of about 30 degrees to 50 degrees to the plane of the central portion 32 of the floorboard 22 as shown in FIG. 4.

As is shown best in FIG. 6, the bight 56 is captured by a snap-fastening structure that includes two low walls 68 and 70. The wall 68 extends from the central portion 68 in the same general direction as the rim 46, which is perpendicular to the plane of the central portion 32 of the floorboard 22, and the wall 70 extends from the rim 46 in a direction substantially parallel to the central portion 32. The wall 68 is spaced from the rim 46 by approximately the diameter of the bight 56 and, similarly, the wall 70 is spaced from the under side of the central portion 32 by approximately the diameter of the bight. Thus, as shown in FIGS. 4 and 6, the bight 56 is captured between the central portion 32, the rim 46, and the low walls 68 and 70. The height of at least one, and preferably both, of the respective walls is preferably less than the diameter of the bight 56 but greater than half the diameter. Although the walls are shown aligned with each other so that they extend toward a location in which they would intersect each other, such intersecting is prevented by making the height of at least one, and preferably both, of the walls less than the diameter of the bight. In order to force the bight 56 through the narrow gap between the ends of the walls 68 and 70, the material of which the floorboard 22 is molded must have a little flexibility to allows the walls 68 and 70 to be spread apart. The resilience of the molded material causes the walls to spring back into their original positions, as shown, thereby firmly and resiliently capturing the bight 56.

FIG. 4 shows that, beyond the bend 62 the arm 58 extends a short distance in a direction parallel to the region of intersection between a part 72 and the front cross member 18. The endmost part 74 of the arm 58 is bent perpendicular to the part 72 to extend perpendicularly through holes 76 and 78 in the cross member 18 and the part 74 is long enough to receive the twist nut 28 that grips it firmly and holds it in place. The extreme end 80 of the arm 60 is bent over about 90 degrees and fits through a hole 82 in only the lower surface of the hollow side member 14.

The hanger 26 is a mirror image of the hanger 24 and therefore parts corresponding to parts of the hanger 24 will be identified by the same reference numbers with the addition of the postscript "a".

The hangers 24 and 26 are assembled with the floorboard 22 by first inserting the arms 60 and 60a through the holes 66 and 66a and swinging the hangers around to bring the bights 56 and 56a against the ends of the walls 68, 70 and 68a, 70a, respectively. Then, the bights 56 and 56a are pressed "home" between their respective pair of walls. In the course of the manipulation, the arms 58 and 58a will have been laid in the notches 64 and 64a.

After the hangers have been assembled with the floorboard, the short end 80 of the arm 60, and the corresponding end 80a of the arm 60a, shown in FIG. 2, are inserted in the hole 82 and a like hole (not shown) in the side member 16. The whole assembly is then pivoted about the short ends 80 and 80a to direct the part 74 up through the holes 76 and 78 in the cross member 18 and the twist nuts 28 and 30 are forced on.

Figure 7:
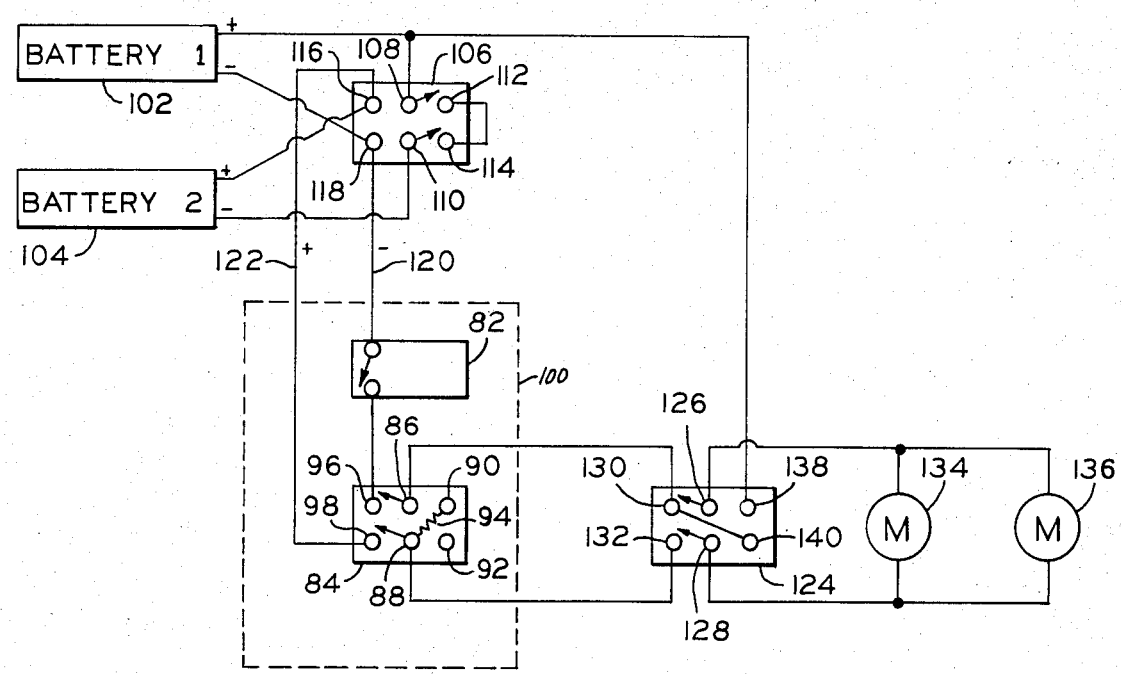
FIG. 7 is a circuit according to the invention for operating a child's riding toy.

The mechanical aspect of some of the electrical components is shown in FIGS. 3 and 4 and the complete circuit is shown in FIG. 7. Referring first to FIG. 3, the floorboard 22 supports two spring-biased switches 82 and 84. The switch 82 is a single-pole-single-throw switch spring-biased to be normally open. The switch 84 is a double-pole-double-throw switch that has two arm terminals 86 and 88 connected internally to arms that are normally spring-biased to contact two terminals 90 and 92. One end of a dynamic braking load 94 in the form of a resistor capable of dissipating substantial power is connected to the terminal 90 and nothing is connected to the terminal 92, although the other terminal of the load 94 could be. In this embodiment, the other terminal of the load 94 is connected to the arm terminal 88. The switch has two more terminals 96 and 98. The terminal 96 is connected to the switch 82 and further connections to the terminals 86, 88, and 98 and to the switch 82 will be shown in FIG. 7.

In that figure, the components just described are bounded by a dotted line 100. The circuit also includes a battery power supply that comprises two batteries 102 and 104 of equal voltage so that they can be connected in parallel. Preferably both batteries are 6 v. 9.5 amp. hour solid gel rechargeable types. The battery power supply also includes a double-pole-double-throw switch 106 that has two arm terminals 108 and 110 connected, respectively to the positive terminal of the battery 102 and the negative terminal of the battery 104. The arms connected to the terminals 108 and 110 can be moved together to contact terminals 112 and 114 that are short-circuited together, or the arms can be moved to contact the terminals 116 and 118 connected, respectively to the positive terminal of the battery 104 and the negative terminal of the battery 102. The terminals 116 and 118 also serve as positive and negative output terminals, respectively, of the battery power supply. When the arms of the switch 106 are placed in contact with the terminals 112 and 114, the batteries 102 and 104 are connected in series, and the voltage between the terminals 116 and 118 is twice the voltage of each battery. This is the high speed condition of the switch 106. When the arms are moved in the opposite direction, to their low speed position, in contact with the terminals 116 and 118, the batteries 102 and 104 are connected in parallel and the output voltage between the terminals 116 and 118 is the same as the voltage of one battery.

The battery power supply has a third terminal, which is the terminal 108 of the switch. The voltage between the terminal 108 and the terminal 118 is the voltage of the single battery 102 and is never the high voltage of the two batteries in series. Thus, the terminal 118 may be considered the common terminal, either of the pair of terminals 108 and 118 or of the pair 116 and 118.

The normally open, spring-biased switch 82 is in series with the common line 120 connected to the terminal 118, and the part of the spring-biased switch 84 comprising the normally open terminals 86 and 96 is also connected in series with the switch 82 and, thus, with the line 120. The active line 122 connects the terminals 116 to the terminal 98 which is normally open-circuited with respect to the arm terminal 88.

The circuit has a reversing switch 124 that has a "forward" and a "reverse" condition. In the "forward" condition, the two arms connected to terminals 126 and 128 are placed, and remain, in contact with two terminals 130 and 132, respectively. The terminals 130 and 132 are connected, respectively, to the terminals 86 and 88 and are thus normally connected across the dynamic braking load 94. When the spring bias in the switch 84 is overcome so that the arms connected to the terminals 86 and 88 are in contact with the terminals 96 and 98, and further, if the spring bias in the switch 82 is also overcome, the terminals 126 and 128 will be connected, respectively, to the common terminal 118 and the active terminal of the battery power supply. Opening of either switch 82 or 84 to its normal condition breaks one or both connections to the battery power supply.

The terminals 126 and 128 are connected to the terminals of motors 134 and 136 that drive one pair of wheels, e.g., the rear wheels, of the toy vehicle shown in FIG. 1. These are d.c. motors capable of running either in forward or reverse direction. The running speed depends on the current supplied through the terminals 126 and 128, which depends, in turn, on the voltage between these terminals. Thus the motors turn at high speed when the batteries 102 and 104 are placed in series and in low speed when they are in parallel. However, such operation can take place only when the reversing switch 124 is in its "forward" condition with the terminals 126 and 128 contacting the terminals 130 and 132.

The switch 124 has two more terminals 138 and 140 contacted by the arms connected to the terminals 126 and 128, respectively, when the switch is placed in its "reverse" condition to cause the toy vehicle to back up. The terminal 140 is connected directly to the terminal 130 so that, if the spring bias in both of the switches 82 and 84 is overcome, the terminal 140 will be connected to the common terminal 118.

In order to prevent the toy vehicle from running in reverse at the higher of its two speeds, the terminal 138 is not cross connected to the terminal 132 but, in accordance with one aspect of this invention, is directly connected to the third terminal 108 of the battery power supply. Thus, when the reversing switch 124 is placed in its "reverse" condition, current supplied to the motors 134 and 136 through the terminals 126 and 128 will be in the opposite direction from that supplied when the switch 124 is placed in its "forward" position. Furthermore, the reverse current has a maximum value less than the maximum possible value of the forward current.

In order for the toy vehicle to move at all under its own power, the child operator must depress both pedals 42 and 44 (FIG. 2). This requires that the child have both feet safely in the confines of the vehicle. Further, if the child is too young to understand the need for pressing both pedals, and therefore does not do so, the vehicle will not run.

As indicated by the information printed on the floorboard 22, there are three modes of forward operation. First, if both pedals 42 and 44 are depressed, the vehicle will go forward. The speed, high or low, will be separately determined by the setting of the switch 106 in FIG. 7. That switch is hand operated in this embodiment. Second, if pressure is maintained on the pedal 42 but removed from the pedal 44, the switch 82 will go to its open circuit condition and the no current will pass through the line to operate the vehicle in either direction. However, pressure on the pedal 42 keeps the terminals 86 and 88 of the switch 84 from being connected across the dynamic braking load 94, and so the vehicle will coast. Third, releasing pressure on the pedal 42, whether or not pressure is maintained on the pedal 44, will allow the switch 84 to return to the condition in which it is normally open-circuited with respect to the battery power supply and will place the dynamic braking load 94 across the terminals 130 and 132 of the reversing switch. These are the terminals associated with the "forward" condition of the switch, and if the arms connected to the terminals 126 and 128 are in their "forward" position in contact with the terminals 130 and 132, the dynamic braking load 94 will be connected directly across the terminals of the motors 134 and 136. As a result, any movement of the vehicle in either direction will cause the motors 134 and 136 to generate current, and whatever the polarity of this current, it will cause the dissipation of power in the load 94. Thus, the load 94 not only stops forward motion of the vehicle but acts like a parking brake. However, since current to run the motors 134 and 136 goes from the terminal 108 of the battery power supply through the terminal 138 and returns through only the arm of the switch 84 connected to the terminal 86, the load 94 does not have the required two connections to the motors 134 and 136 when the switch 124 is in its "reverse" position.

The switches 82 and 84 could be operated without the pedals 44 and 42, since both switches have a rocking operation. However, as shown in FIG. 4, the pedal 42 protects the switch 84 and assures that pressure is put on the proper part of the actuator 142 of the switch 84. To do so, the pedal, which is hinged on its tang 38, has a ridge 144 that presses on the edge of the actuator necessary to overcome the force of an internal biasing spring in the switch 84. That spring returns the pedal 42 to its upper position. A screw 146 extending through a hole 148 in the footboard 22 engages the free end of the pedal 44 and prevents easy removal of the pedal.

While there have been described above the principals of this invention in connection with specific apparatus, it is to be clearly understood that this description is made only by way of example and not as a limitation to the scope of the invention.

What is claimed is:

1. A child's riding toy comprising:
   motor drive means;
   reversing switch means connected to the motor drive means and having a forward position and a reverse position;
   battery power supply means connected to the reversing switch means to supply a plurality of levels of driving current up to a predetermined maximum level through the reversing switch means in one polarity to the motor drive means when the reversing switch means is in its forward position;
   a separate connection means connected from the battery power supply means to the reversing switch means for only supplying less than said predetermined maximum level of driving current through the reversing switch means in an opposite polarity when the reversing switch means is in its reverse position, whereby a maximum driving current supplied to the motor drive means when the reversing switch means is in its reverse position is less than and of opposite polarity to the predetermined maximum level of driving current supplied to the motor drive means when the reversing switch means is in its forward position;
   the battery power supply means comprising means to supply, selectively, high and low battery voltages to the reversing switch means, thereby to supply said driving current in one polarity to the motor drive means when the reversing switch means is in its forward positon;
   spring-biased switching means connected between the battery power supply means and the reversing switch means normally to disconnect the battery power supply means from the reversing switch means, whereby no driving current will normally be supplied to the motor drive means, the spring-biased switching means being actuable by a driver of the toy to supply the driving current to the motor drive means in a polarity determined by a position to which the reversing switch is set; and
   a dynamic braking load connected to the spring-biased switching means to be connected thereby to the reversing switch means when the spring-biased switching means is in a normal position, whereby current generated by the motor drive means when the spring-biased switching means is not actuated can flow through the dynamic braking load.

2. The toy of claim 1 in which the spring-biased switching means comprises a first spring-biased switch connected to the reversing switch means and in series between the reversing switch means and the battery power supply means, the dynamic braking load being connected to the first spring-biased switch, and a second spring-biased switch connecting the first spring-biased switch to the battery power supply means to allow the driving current from the battery power supply means to flow through the first spring-biased switch only when the second spring-biased switch is actuated by the driver operating the toy.

3. The toy of claim 2 in which the first and the second spring-biased switches are located at different places on the toy to be actuated by different parts of the body of the driver operating the toy, whereby the driver must be properly in position on the toy to actuate both of the first and second spring-biased switches simultaneously to supply the driving current to the motor drive means.

4. The toy of claim 3 further comprising foot-support means to support both feet of the driver operating the toy, the first spring-biased switch being located on the foot-support means to be actuated only by one foot of the driver, and the second spring-biased switch being located on the foot-support means to be actuated, at the same time as the first spring-biased switch, only by the other foot of the driver.

5. The toy of claim 4 in which the foot-support means comprises a floorboard, one of the first and second spring-biased switches being supported on the floorboard to be actuated by the left foot of the driver and the other of the first and second spring-biased switches being supported on the floorboard to be actuated by the right foot of the driver, said toy further comprising an operator's seat, said floorboard comprising a generally upwardly facing surface and a lower surface facing in an opposite direction, snap-fastening means at least partly extending from the lower surface, and channels along an edge of the floorboard spaced from the snap-fastening means; a frame; and hanger means engaging the snap-fastening means and extending along the lower surface of the floorboard and through said channels, said frame comprising hanger-receiving means to receive the hanger means and to hold the hanger means substantially fixedly in position relative to the frame during operation of the toy.

6. The toy of claim 5 in which the hanger means comprises a rod bent U-shaped to have a bight that engages the snap-fastening means, and two arms that extend at an angle to the bight and through first and second channels to lock the floorboard into a substantially fixed position relative to the frame.

7. The toy of claim 6 in which one of the first and the second channels is an open slot and the other of the first and the second channels is a hole defined by surrounding wall surfaces of the floorboard.

8. The toy of claim 6 which the floorboard comprises a central portion and a rim extending in one direction from a perimeter of the central portion of the floorboard, said snap-fastening means comprising a first wall extending from the lower surface of the floorboard and spaced from an inwardly facing surface of the rim by a distance sufficient to receive the bight of the hanger means, a second wall extending from said inwardly facing surface of said rim generally parallel to the lower surface of the floorboard and spaced from said lower surface by a distance sufficient to receive the bight of the hanger means, at least one of said first and second walls being sufficiently flexible to admit the bight of the hanger means into a space defined by the lower surface of the floorboard, the inwardly facing surface of the rim, and the two walls.

* * * * *